Sept. 17, 1968 T. LERNER 3,402,258

VARIABLE VELOCITY SCANNING FOR TV SYSTEMS

Filed Sept. 16, 1965

INVENTOR.
THEODORE LERNER
BY
Bean, Brooks, Buckley & Bean
ATTORNEYS

United States Patent Office 3,402,258
Patented Sept. 17, 1968

1 2

3,402,258

VARIABLE VELOCITY SCANNING FOR TV SYSTEMS

Theodore Lerner, Williamsville, N.Y., assignor to Bell Aerospace Corporation, Wheatfield, N.Y.
Filed Sept. 16, 1965, Ser. No. 487,867
5 Claims. (Cl. 178—6.8)

ABSTRACT OF THE DISCLOSURE

The camera of a television system is caused to vary the speed of its horizontal sweep in response to the output of a pulse generator. The pulse generator is controlled to have an output whenever the video output of the camera differs by more than a predetermined amount from the output of a variable reference voltage generator which is also controlled by the pulse generator to vary the output of the reference voltage generator toward the video output.

This invention relates to signal transmission systems for television and, in particular, the invention relates to a pulse coded television transmission system inherently permitting bandwidth compression and reduction of power required to communicate the information.

It is well known that the picture signal of a television system involves large variations in information rate. The fact that such signals are characterized by periods of high information content and periods of low information content has suggested various techniques for bandwidth compression whereby such a signal is transmitted on a channel having insufficient information capacity to accommodate the periods of high information content. One such technique involves the principle of variable velocity scanning. Thus, if the scanning velocity is slow in regions of high picture detail, and fast in regions of low picture detail, the total scanning time remains unaltered while the information rate is decreased. Unfortunately, there are two serious problems attendant to this technique. First, noise introduces serious spatial distortion unless the signal-to-noise ratio is greatly increased with the result that bandwidth compression is obtained only at the expense of increased transmitter power. Second, even with no noise, spatial distortion is produced by the bandpass characteristics of the receiver. Although this second problem may be reduced by high frequency pre-emphasis prior to transmission, with the pre-emphasis characteristics matched to the receiver bandpass characteristics, the present invention is directed to a system which, although it includes the principle of variable velocity scan, eliminates the aforementioned problems ordinarily associated with such a technique.

It is, therefore, a primary object of this invention to provide an improved form of signal transmission system permitting both bandwidth compression and reduction in power required for transmission.

More specifically, it is an object of this invention to provide a television signal transmission system in which the sweep velocity is fast for periods of low information content and slow for periods of high information content, with variable reference voltage generating mechanism being used to simulate the video output, and the reference voltage generating mechanism being in turn controlled and varied in voltage by pulse generating means having pulse outputs in response to differences between the video output and the reference voltage which exceeds a predetermined amount, the pulse outputs being used to both alter the reference voltage toward the video output and slow the sweep as aforesaid. In this way, the pulse output information may be transmitted and the simulated signal reproduced, the transmitted signal inherently providing redundancy removal. Spatial distortion due to noise in the comunication channel is minimized since the system is basically of the hard theshold type, whereas spatial distortion due to finite receiver bandwidth will not occur unless the signal bandwidth is reduced to a value lower than that required for an equivalent AM system. Thus, by wedding a pulse coded system with variable velocity scanning, the two most important objections to variable velocity scan are eliminated.

Other objects and advantages of the invention will appear from the specification hereinafter and the accompanying drawing, wherein.

Figure 1:
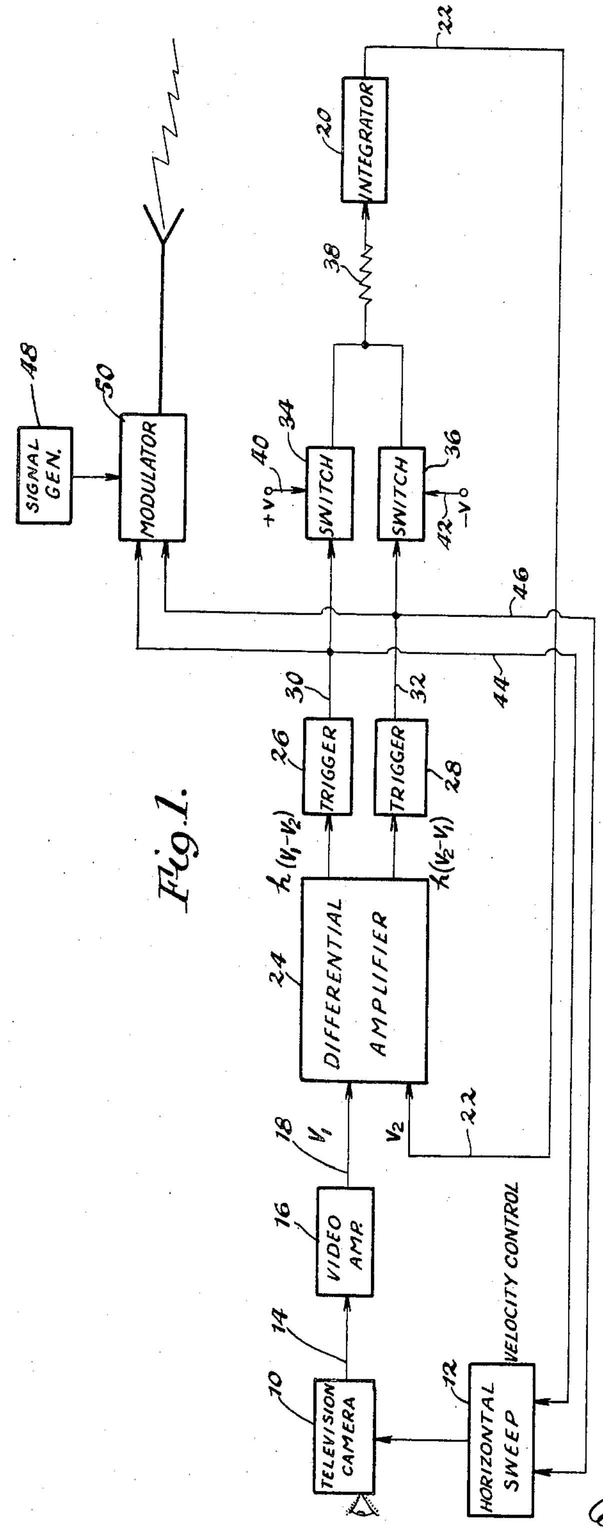
FIG. 1 is a block diagram illustrating the principles of the present invention.
Figure 2:
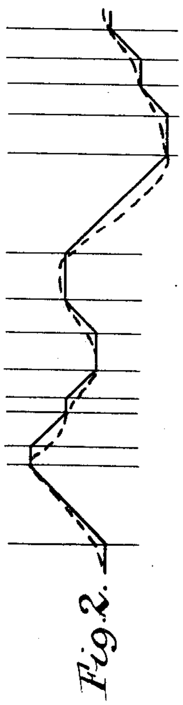
FIG. 2 is a dotted line waveform of the video output with the simulated signal of the reference voltage means superimposed thereon in full line.
Figure 3:
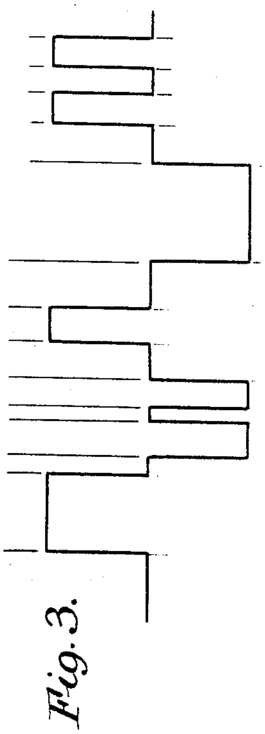
FIG. 3 is a waveform showing the output of the pulse generator.

With reference to FIG. 1, a television camera 10 having horizontal sweep velocity control 12 is shown for producing a video output at 14 which, after being applied to a suitable amplifier 16, is represented by the video output 18 of instantaneous amplitude $V_1$. A variable voltage reference source includes an integrator 20 having an output at 22 of instantaneous amplitude $V_2$. The outputs $V_1$ and $V_2$ are applied to a differential amplifier 24 having an instantaneous output $k(V_1-V_2)$ or $k(V_2-V_1)$ dependent upon whether the reference voltage generator output is greater than the video output or vice versa, $k$ being a constant. The differential amplifier outputs are applied to the respective Schmitt triggers 26 and 28 which are responsive to a difference between the two outputs $V_1$ and $V_2$ greater than some predetermined amount to produce an output pulse at the terminal 30 or 32 dependent upon the nature of the difference. These output pulses are applied to suitable switches 34 and 36 which are coupled, through the resistor 38, to the integrator 20 to either increase or decrease the voltage level thereof, dependent upon whether the relatively positive voltage source 40 or the relatively negative voltage source 42 is coupled to the integrator.

The pulse outputs at 30 and 32 are both coupled as at 44 and 46 to the horizontal sweep control 12 to slow the sweep velocity during pulse periods. Ideally, the amount of sweep velocity slowing would be such that both pulse periods and interpulse periods would occupy equal times but since picture detail can be expected to vary over a considerable range, the amount of slowing is dictated by a picture of average detail. The pulse outputs at 30 and 32 are also applied to suitable transmitting means including the signal generator 48 and the modulator 50 for transmission of the pulse information.

Obviously, the system shown lends itself readily to 3-phase modulation transmission or 3-frequency modulation transmission where one phase (or one frequency) represents interpulse periods, another phase (or another frequency) represents pulse periods indicative of increase in video intensity, and the remaining phase (or remaining frequency) represents pulse periods indicative of decrease in video intensity.

It is seen that the system provides a bandwidth reduction below that of a pulse-code modulation system, but not below that of an amplitude modulation system. It provides, however, the noise immunity characteristic of a pulse-code modulation system.

Whereas only one form of the invention has been illustrated and described in detail hereinabove, it will be understood that various changes may be made therein without departing from the spirit of the invention or the scope of the following claims.

What is claimed is:

1. In a television system in combination,
a camera having a horizontal sweep control and having a video output,
variable reference voltage generating means,
means for determining the difference between said video output and said reference voltage,
pulse generating means responsive to an output of the last means which exceeds a predetermined amount for varying the output of said reference voltage generating means toward said video output, said pulse generating means being connected to said horizontal sweep control to slow the sweep during the pulse period,
and means for transmitting the output pulse information of said pulse generating means.

2. In a television system, on combination,
a camera having a horizontal sweep control and a video output,
reference voltage generating means,
pulse generating means for producing an output pulse in response to an instantaneous difference between said video output and said reference voltage which exceeds a predetermined amount,
means for varying said reference voltage toward said video output in response to a pulse output from said pulse generating means,
means for slowing the sweep velocity of said camera during the pulse output period of said pulse generating means,
and means for transmitting the pulse output information of said pulse generating means.

3. The system according to claim 1 wherein said variable reference voltage generating means is an integrator, and said pulse generating means includes at least a pair of Schmitt triggers for respectively raising and lowering the voltage level of said integrator.

4. The system according to claim 2 wherein said reference voltage generating means is an integrator.

5. The system according to claim 4 wherein said pulse generating means includes at least a pair of Schmitt triggers for respectively raising and lowering the voltage level of said integrator.

References Cited

UNITED STATES PATENTS

| | | | |
|---|---|---|---|
| 2,916,553 | 12/1959 | Crowley | 325—38.1 |
| 3,273,141 | 9/1966 | Hackett | 325—38.1 |
| 3,286,026 | 11/1966 | Greutman et al. | |

ROBERT L. GRIFFIN, *Primary Examiner.*

J. T. STRATMAN, *Assistant Examiner.*